US012489361B2

(12) United States Patent
Santiago et al.

(10) Patent No.: US 12,489,361 B2
(45) Date of Patent: Dec. 2, 2025

(54) BIDIRECTIONAL POWER CONVERTER WITH PHASE LEG FAULT DETECTION FOR CHARGING A BATTERY THAT POWERS A MULTIPHASE LOAD

(71) Applicant: NXP B.V., Eindhoven (NL)

(72) Inventors: Erik Santiago, La Tour du Crieu (FR); Jérôme Dietsch, Lavernose-Lacasse (FR); Angela Maria Bernal Pinzon, Toulouse (FR); Rami Troudi, Blagnac (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/625,441

(22) Filed: Apr. 3, 2024

(65) Prior Publication Data

US 2024/0348155 A1    Oct. 17, 2024

(30) Foreign Application Priority Data

Apr. 17, 2023   (EP) .................................. 23305583

(51) Int. Cl.
| | | |
|---|---|---|
| H02M 1/32 | (2007.01) | |
| H02J 7/00 | (2006.01) | |
| H02J 7/02 | (2016.01) | |
| H02J 7/24 | (2006.01) | |
| H02M 7/797 | (2006.01) | |

(52) U.S. Cl.
CPC ........... *H02M 1/325* (2021.05); *H02J 7/0047* (2013.01); *H02J 7/0063* (2013.01); *H02J 7/02* (2013.01); *H02J 7/24* (2013.01); *H02M 7/797* (2013.01); *H02J 2207/20* (2020.01)

(58) Field of Classification Search
CPC ...... H02M 1/325; H02M 7/797; H02J 7/0047; H02J 7/0063; H02J 7/02; H02J 7/24; H02J 2207/20
See application file for complete search history.

(56) References Cited

U.S. PATENT DOCUMENTS

| | | |
|---|---|---|
| 8,847,555 B2 | 9/2014 | Loudot et al. |
| 10,355,581 B2 | 7/2019 | Guven et al. |
| 11,383,610 B2 | 7/2022 | Reuss |
| 2018/0351398 A1* | 12/2018 | Tang ..................... H02J 7/1423 |

(Continued)

FOREIGN PATENT DOCUMENTS

| | | |
|---|---|---|
| CN | 114726244 A | 7/2022 |
| EP | 3568905 B1 | 3/2023 |
| WO | 2017083521 A1 | 5/2017 |

OTHER PUBLICATIONS

Eull, M., "Bidirectional Non-Isolated Fast Charger Integrated in the Electric Vehicle Traction Drivetrain", IEEE Transactions on Transportation Electrification, vol. 8, Issue: 1, Mar. 2022.

(Continued)

*Primary Examiner* — Carlos Amaya (57) ABSTRACT

A bidirectional power converter that includes phase legs that are used for both powering a multiphase load from a battery and for charging the battery from a power source. The converter includes fault detection for detecting faults in the phase legs of the converter. In response to a detection of a fault, the converter can utilize a spare phase leg in charging the battery such as in a multiphase charging mode or in single phase charging mode.

20 Claims, 6 Drawing Sheets

(56) References Cited

U.S. PATENT DOCUMENTS

2019/0305690 A1    10/2019    Kusch et al.

OTHER PUBLICATIONS

Khaligh, A., "Global Trends in High-Power On-Board Chargers for Electric Vehicles", IEEE Transactions on Vehicular Technology, vol. 68, No. 4, Apr. 2019.

Zhang, Y., "Leakage Current Issue of Non-Isolated Integrated Chargers for Electric Vehicles", 2018 IEEE Energy Conversion Congress and Exposition (ECCE), Sep. 23-27, 2018.

\* cited by examiner

BIDIRECTIONAL POWER CONVERTER WITH PHASE LEG FAULT DETECTION FOR CHARGING A BATTERY THAT POWERS A MULTIPHASE LOAD

CROSS-REFERENCE TO RELATED APPLICATIONS

This application claims the priority under 35 U.S.C. § 119 of application Ser. No. 23/305,583.9, filed on 17 Apr. 2023, the contents of which are incorporated by reference herein.

BACKGROUND OF THE INVENTION

Field of the Invention

This invention relates to a bidirectional power converter having phase leg fault detection and compensation that is used for charging a battery of a multiphase load.

Background

Some electric motors are powered by batteries such as with an electrical drive motor for an electric vehicle. Some electric motor control systems include a bidirectional power converter for controlling the power for charging a battery and for controlling the power provided to a drive motor.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted. The Figures are not necessarily drawn to scale.

DETAILED DESCRIPTION

The following sets forth a detailed description of a mode for carrying out the invention. The description is intended to be illustrative of the invention and should not be taken to be limiting.

Disclosed herein is a bidirectional power converter that includes phase legs that are used for both powering a multiphase load from a battery and for charging the battery from a power source. The converter includes fault detection for detecting faults in the phase legs of the converter. In response to a detection of a fault, the converter can utilize a spare phase leg in charging the battery such as in a multiphase charging mode or in single phase charging mode.

In one embodiment, implementing a bidirectional power converter with a phase leg fault detection system and the ability to implement a spare phase leg in response to the fault may enable a battery to be charged even with the fault condition allowing for further operation of the battery powered system. This feature may be beneficial in systems requiring continuing operation such as with an electric vehicle or emergency power system. With an electric vehicle, the immediate shut down of a drive motor in response to a fault in a phase leg may not be possible (e.g., if driving on a highway) or practical.

Figure 1:
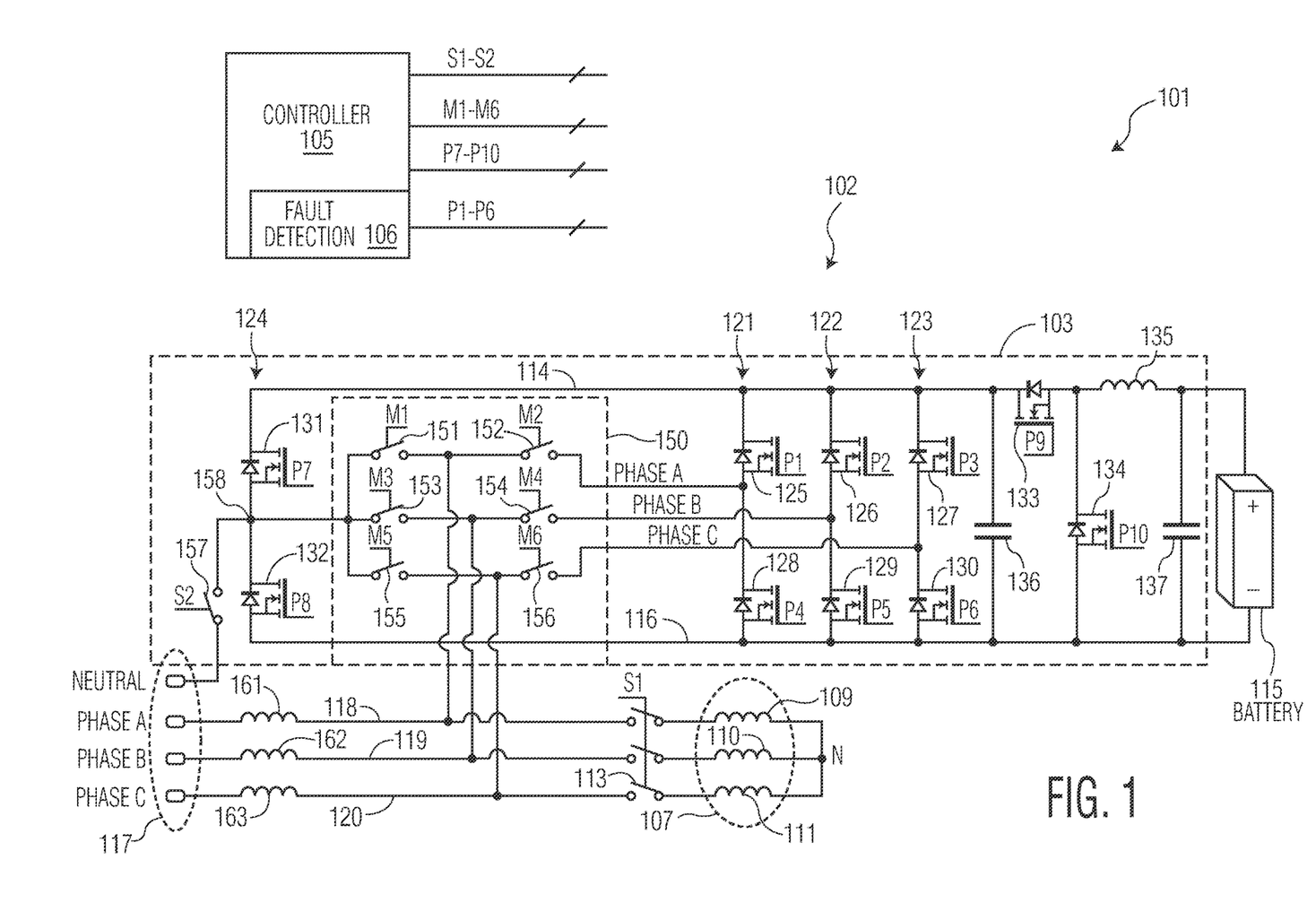
FIG. 1 is a circuit diagram of a bidirectional power converter for charging a battery and for powering a motor from the battery according to one embodiment of the present invention.
Figure 2:
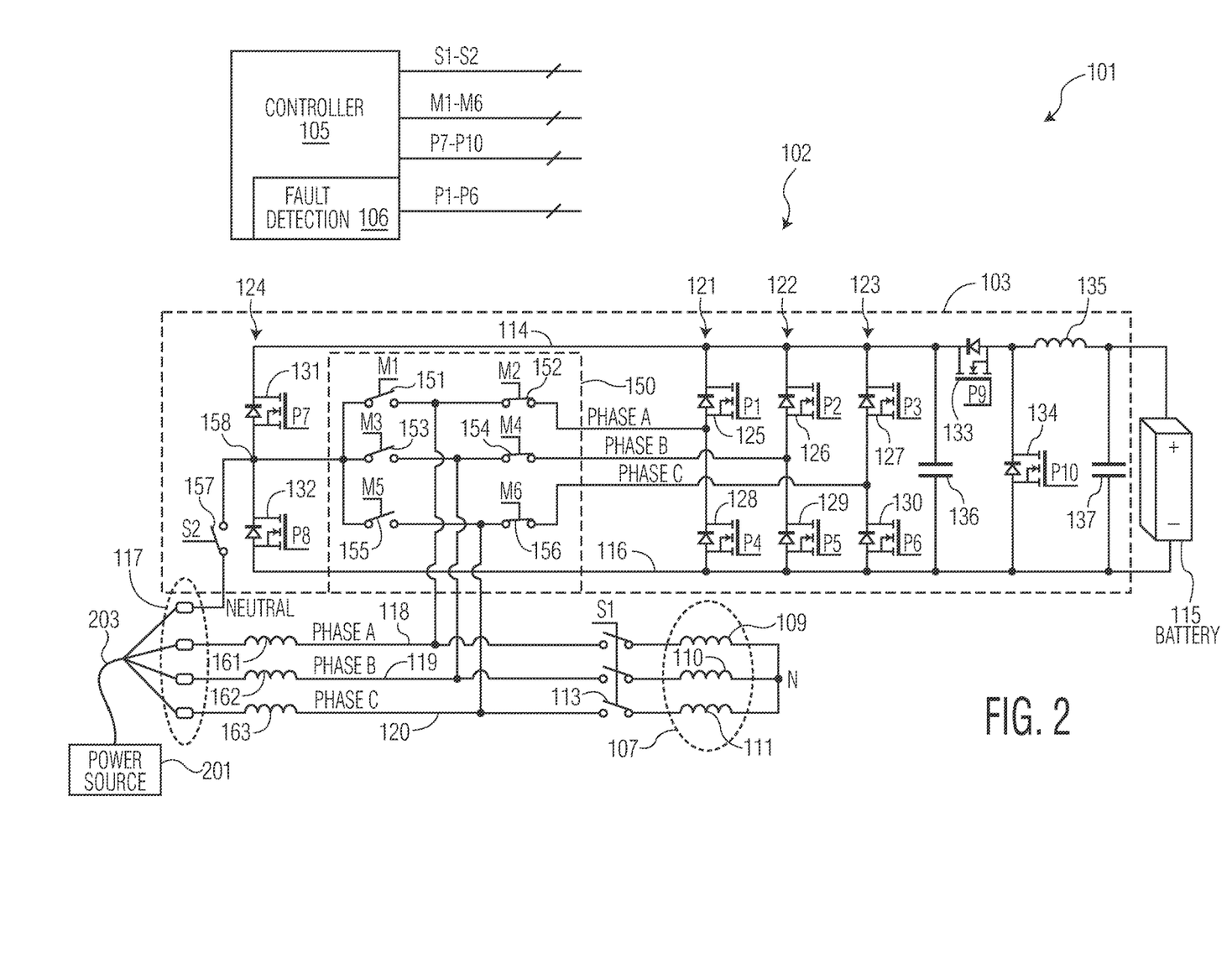
FIG. 2 is a circuit diagram of the converter of FIG. 1 during a multiphase charging mode according to one embodiment of the present invention.

FIG. 1 shows a system 101 that includes a multiphase electric motor 107, a battery 115, and circuitry for powering motor 107 from battery 115 and for charging battery 115 from a power source (e.g., power source 201 of FIG. 2 or by regenerative braking of motor 107). In one embodiment, system 101 is implemented in an electric vehicle (not shown) where motor 107 propels the vehicle. However, the system of FIG. 1 may be implemented in other applications for other battery powered multiphase motors. Motor 107 includes three phase windings 109, 110, and 111 which are powered from three AC phases (Phase A, Phase B, and Phase C, respectively) where the phases are offset from each other (e.g., at 120 degrees).

Battery 115 includes one or more rechargeable battery cells and provides DC power to power motor 107 during operation. In one embodiment, battery 115 provides DC power at a voltage of 400V, but may provide DC power at other voltages (e.g., 800V, 48V) in other embodiments. In one embodiment, the cells of battery 115 are lithium ion battery cells, but may be of other types of cells (e.g., nickel cadmium, nickel metal hydride) in other embodiments.

The system 101 includes a bidirectional power converter 102 for controlling the three AC phases (Phase A, Phase B, and Phase C) provided to motor 107 when powered by battery 115 and for controlling the voltages for charging battery 115. As used herein, a "bidirectional power converter" is an apparatus that is used to convert power from DC to AC as well as convert power from AC to DC.

In the embodiment shown, bidirectional power converter 102 includes conversion circuitry 103 for controlling the AC phases for powering motor 107 and for charging battery 115. In one embodiment, conversion circuitry 103 includes inductor 135, capacitors 136 and 137, and power switches 133 and 134, which are controlled by signals P9 and P10 provided by controller 105. In one embodiment, when battery 115 is providing power to power motor 107, power switch 134 is open and power switch 133 is closed to provide a current path from the positive terminal though inductor 135 to rail 114 to bias rail 114 at the DC voltage of battery 115 (e.g., 400V). In other embodiments when powering motor 107, capacitors 136 and 137, inductor 135, and power switches 133 and 134 are configured in a boost convertor topology where power switches 133 and 134 are turned on an off by pulse signals P9 and P10 provided by controller 105 to control the regulated DC voltage at a specified voltage level (e.g., 400V) at power rail 114 with respect to power rail 116. In some embodiments, the differential DC voltage between rail 114 and rail 116 is adjusted during operation to control the amount of power provided to motor 107. In other embodiments, conversion circuitry 103 may include other types of DC-DC converter circuitry or not include DC-DC converter circuitry.

Conversion circuitry 103 includes three phase legs 121, 122, and 123 that convert the DC power at rail 114 with respect to rail 116 to three AC phases (Phase A, Phase B, and Phase C, respectively) that are offset at 120 degrees from each other to provide 3 phase power to the three phase windings 109, 110, and 111, respectively, for powering motor 107. In one embodiment, the power switches 125-130 of phase legs 121, 122, and 123 are turned on and off by pulse width modulated signals P1-P6 from controller 105 to generate three AC phase sinusoidal currents at the three phase windings 109-111 of motor 107. For example, power switch 125 is turned on and off to provide pulses (at the voltage of rail 114) to winding 109 to generate a positive sinusoidal phase current of Phase A and power switch 128 is turned on and off to provide pulses (at the voltage of rail 116) to generate a negative sinusoidal phase current of Phase A. The PWM signals P1-P6 are turned on and off at a frequency higher than the sinusoidal frequency. During the operation of motor 107, three pole switch S1 is closed and switches 152, 154, and 156 are closed to couple the phase windings of motor 107 to phase legs 121-123. In one embodiment, the duty cycles of the PWM signals P1-P6 are adjusted to control the current of the three phases for controlling the amount of power provided to motor 107. In other embodiments, converter 102 may utilize phase legs 121-123 in a different manner for providing power to motor 107. For example, the power switches 125-130 may be controlled to implement a variable frequency drive for controlling the speed of motor 107 where the frequency of the phases is adjusted to control the speed of the motor.

Bidirectional power converter 102 includes a controller 105 that provides signals S1-S2, M1-M6, and P1-P10 to control the switches of system 101. Not shown in FIG. 1 are inputs of controller 105 that are connected to various nodes of converter 102 for monitoring the voltages and currents of system 101 during operation. For example, controller 105 includes inputs (not shown) to monitor the voltages of rail 114 and rail 116, the positive terminal of battery 115, the nodes between the power switches of phase legs 121-123, node 158, lines 118, 119, and 120, the connector terminals 117, the motor windings 109-111, and the voltages and currents of power switch signals P1-P10. Controller 105 may also receive other information such as e.g., the speed of the vehicle and the desired speed of the vehicle. Controller 105 uses the monitored voltages, currents, and other information in controlling the opening and closing of the power switches 125-134, switches 151-157, and switch 113 for providing the proper voltages and currents for driving motor 107 and charging battery 115. In some of these embodiments, controller 105 May include level shifters or transformers for stepping down the voltages of the monitored signals. In other embodiments, controller 105 may monitor voltages and/or current of different nodes.

Controller 105 includes fault detection 106 for detecting faults (e.g., either shorts or opens) in phase legs 121, 122, and 123. In one embodiment, fault detection 106 monitors signals P1-P6 and other nodes of conversion circuitry 103 (e.g., the voltage or current at the nodes between the power switches 125-130 of a phase leg and the voltages of rails 114 and 116) to determine unusual voltage or current responses in those signals or nodes that are indicative of faults in the phase legs.

In one embodiment, controller 105 includes a digital processor executing code to control the conductivity of switches 125-134, 151-157, and 113 and for implementing the monitoring functions of fault detection 106. However, in other embodiments, controller 105 may include at least some hardware control loops for controlling the conductivity of these switches and/or hardware for implementing fault detection 106. In some embodiments, controller 105 may include a separate processor for implementing fault detection 106.

If a fault is determined in one of phase legs 121-123, circuitry 103 includes a spare phase leg 124 that can be used to replace the phase leg with the fault ("faulty phase leg"). Converter 102 includes switch circuitry 150 with switches 151-156 whose conductivity is controlled by signals M1-M6 from controller 105 for removing a faulty phase leg and implementing spare phase leg 124 in its place in the powering of motor 107 and the charging of battery 115. In the embodiment shown, controller 105 opens the switch of switches 152, 154, and 156 that is connected to the faulty phase leg and closes the switch of switches 151, 153, and 155 that is connected to the switch of switches 152, 154, or 156 that was opened to replace the faulty phase leg with the spare phase leg 124. Closing one of switches 151, 153, or 155 connects node 158 to one of phase windings 109-111 (when switch S1 is closed) which allows phase leg 124 to be used for providing an AC phase current to motor 107.

Spare phase leg 124 includes power switches 131 and 132 and node 158. Power switches 131 and 132 are controlled by signals P7 and P8 from controller 105 to open and close as would the power switches of the faulty leg in order for spare phase leg 124 to take the place of the faulty phase leg. In some embodiments, fault detection 106 would also monitor phase leg 124 for faults, either by monitoring signals S7 and S8, or by monitoring other nodes (e.g., node 158) of phase leg 124.

In one embodiment, power switches 125-134 are silicon carbide (SiC) MOSFETs with a diode connected between its source and drain. However, other types of power switches (e.g., insulated gate bipolar transistors (IGBT), power MOSFETS) may be utilized in other embodiments.

FIG. 2 shows system 101 while battery 115 is being charged in a multiphase mode by a power source 201 providing 3 phase AC power, where no faults are detected in phase legs 121, 122, and 123. Power source 201 is connected to connector terminals 117 with cord 203, which FIG. 2 shows as having four wires (Phase A, Phase B, Phase C, and Neutral). In some embodiments, cord 203 does not include a neutral wire. Not shown in FIG. 2 is a ground wire for cord 203. In one embodiment, power source 201 is an electric vehicle charging station that provides 3 phase, AC power for charging battery 115 at a frequency (e.g., 60 Hz in the US, 50 Hz in Europe) and at a voltage (e.g., 208 V, 230 V, 400 V, 480 V). In some embodiments, power source is a 480 V or 400V receptacle with electricity supplied from an electric utility through breakers, transformers, and switches (not shown). However, a battery may be charged from other power sources in other embodiments.

In some embodiments, battery 115 may be charged by motor 107 when the motor is slowing down through a regenerative breaking process. In some embodiments, charging system 101 may include transformers for stepping up or down the voltage from a power source.

System 101 includes boost inductors 161-163 for implementing a boost converter topology with phase legs 121-123 and capacitor 136 during a battery charging operation from power source 201.

During charging in a three phase mode, switches 152, 154, and 156 are closed to electrically connect lines 118, 119, and 120 to phase legs 121, 122, and 123, respectively. Switches 151, 153, 155, and 157 are open.

During a three phase mode charging operation, power switches 125-130 are opened and closed repeatedly to provide a DC voltage deferential at rail 114 with respect to rail 116. In one embodiment, converter 102 implements a bridgeless totem power boost converter topology for charging battery 115 in a three phase mode. In some embodiments of this mode, controller 105 implements successive alternating subphases of an "inductor load" subphase and a "capacitor charge" subphase for an AC phase (Phase A, Phase B, and Phase C) when that AC phase is not the lowest voltage AC phase. Specifically, in an inductor load subphase, controller 105 controls the power switches of each of phase legs 121-123 to load boost inductors (e.g., boost inductors 161-163) of the higher voltage AC phases of Phase A, Phase B, and Phase C with energy from the phase conductors of cord 203. In the subsequently following capacitor charge subphase, the energy in the loaded boost inductors (161-163) is discharged at a higher voltage to capacitor 136.

For a three phase charging mode, each AC phase (Phase A, Phase B, and Phase C) is the lowest voltage phase for 120 degrees of the 360 degree phase cycle. During that time, the other two higher voltage phases each transition back and forth between the inductor load subphase and the capacitor charge subphase. However, the inductor load subphases and the capacitor charge subphases for each of the two higher voltage AC phases, may not occur at the same time. In some embodiments, the time at each subphase is dependent upon the instantaneous voltage of the AC phase and the frequency of the pulse width modulated signals of the power switch control signals.

In one embodiment of a bridgeless totem pole multiphase charging mode, when an AC phase is at the lowest voltage of the three AC phases, its corresponding phase leg's "lower power switch" (power switches 128, 129, and 130) is closed and its corresponding phase leg's "upper power switch" (power switches 125, 126, and 127) is open. For the other two higher voltage AC phases, in the inductor load subphase, the lower power switch (128, 129, and 130) is closed and the upper power switch (125, 126, and 127) is open. For the other two higher voltage AC phases in the capacitor charge subphase, the lower power switch (128, 129, and 130) is open and the higher power switch (125, 126, and 127) is closed to charge capacitor 136.

For example, when Phase C is the lowest voltage AC phase, switch 130 is closed and switch 127 is open. At this time when Phase B is in the inductor load phase to load energy in inductor 162, power switch 129 is closed and power switch 126 is open. When Phase B is in the capacitor charge phase, power switch 129 is open and power switch 126 is closed to charge capacitor 136. When Phase A is in the inductor load subphase to load energy in inductor 161, power switch 128 is closed and power switch 125 is open. When Phase A is in the capacitor charge subphase, power switch 128 is open and power switch 125 is closed to charge capacitor 136.

In other embodiments, the phase legs may be controlled and/or conversion circuitry 103 may be configured differently to implement other converter topologies for multiphase charging in other embodiments.

In the embodiment shown, power switches 133 and 134, inductor 135, and capacitor 137 are configured in a buck converter topology to convert the DC voltage on rail 114 to a desired charge voltage at the positive terminal of battery 115 during battery charging. In other embodiments, conversion circuitry 103 may implement other convertor topologies or other DC conversion methods.

When a fault is detected in one of the phase legs 121-123, controller 105 can control switches 151-157 to isolate the phase leg with the fault and continue charging without the faulty phase leg.

Figure 3:
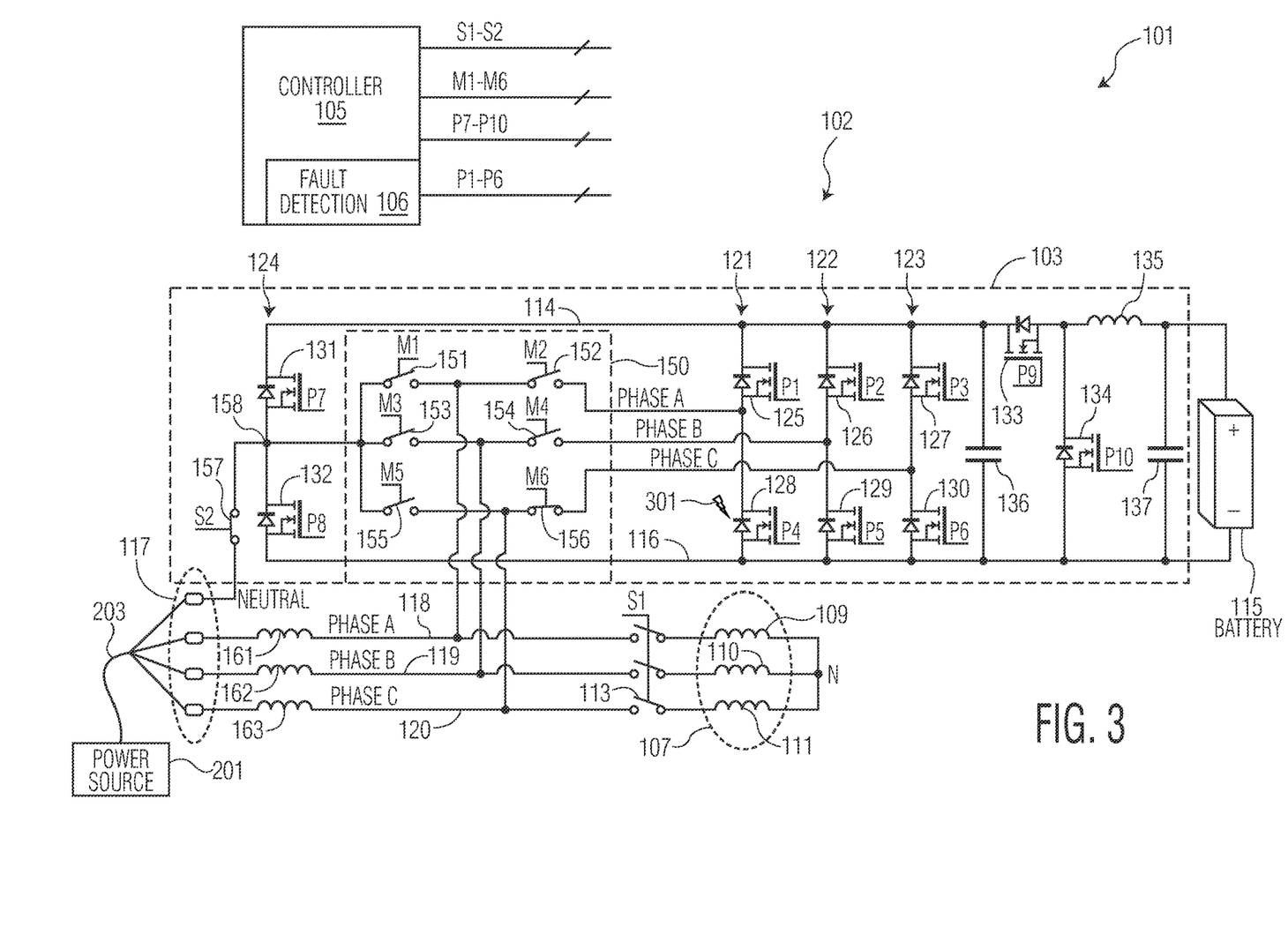
FIG. 3 is a circuit diagram of the converter of FIG. 1 during a single phase charging mode in response to a detected fault in a phase leg according to one embodiment of the present invention.

FIG. 3 shows system 101 where a faut (301) has been detected in phase leg 121, and phase leg 124 is utilized for single phase charging of battery 115. FIG. 3 shows that fault 301 has been detected at phase leg 121 due to a short or open at power switch 128. In response to the detected fault, controller 105 opens switches 152 and 154 and closes switch 157 to connect node 158 to the neutral conductor of cord 203. In this mode of operation, phase leg 123 is used in a single phase charging mode (e.g., at 277 volts, 220 volts, or 120 volts), along with phase leg 124. Phase legs 121 and 122 are not used.

In one embodiment, converter 102 implements a bridgeless totem pole converter topology when charging in a single phase mode with spare phase leg 124. In one embodiment of this mode, controller 105 controls the power switches of phase leg 124 and the power switches of one selected phase leg (phase leg 123 in FIG. 3) of phase legs 121-123 to implement successive subphases of a load inductor subphase (loading one boost inductor of boost inductors 161-163 corresponding to the selected phase leg with energy) and a capacitor charge phase (discharging energy from the loaded boost inductor at a higher voltage to capacitor 136).

In one example of an embodiment where a single phase charge mode with a bridgeless totem pole boost converter topology is implemented with phase leg 123 and spare phase leg 124 as shown in FIG. 3, switches 156 and 157 are closed and switches 151-155 are open, where phase legs 121 and 122 are not used in charging battery 115. When AC Phase C of power source 201 is at a positive voltage with respect to neutral, power switches 130 and 132 are closed and power switches 127 and 131 are open to load power into boost inductor 163 during an inductor load subphase. During a following capacitor charge subphase, power switches 127 and 132 are closed and power switches 130 and 131 are open to charge capacitor 136 from inductor 163. These subphases are performed multiple times during a single positive phase of AC Phase C. The number of times may depend on the frequency or the pulse width of the pulse width modulated signals controlling the power switches.

When AC Phase C is at a negative voltage with respect to neutral, power switches 127 and 131 are closed and power switches 130 and 132 are open to load power into boost inductor 163 during an inductor load subphase. During a following capacitor charge subphase, power switches 130 and 131 are closed and power switches 127 and 132 are open to charge capacitor 136 from inductor 163. These subphases are performed multiple times during a single negative phase of AC Phase C. The number of times may depend on the frequency or the pulse width of the pulse width modulated signals controlling the power switches. Accordingly, in this embodiment, power switches 131 and 132 of the spare phase leg 124 are opened and closed at a lower frequency (e.g., the frequency of the utility AC supply voltage (60 hz, 50 hz)) than the power switches (127 and 130) of the phase leg (e.g., phase leg 123) utilized with the spare phase leg 124 in charging in a single phase mode.

A single phase charging operation utilizing spare phase leg 124 described above may be performed with phase leg 121 or 122 if those phase legs do not have a detected fault.

Also, other single phase charging mode topologies may be implemented by converter 102 in charging with phase leg 124 in other embodiments.

In other embodiments, conversion circuitry 103 would not include switch 157, but instead node 158 would be permanently connected to the neutral terminal of connector terminal 117. This would not affect phase leg 124 from being used in powering motor 107 in that node 158 would be not connected to a neutral of a power source in that cord 203 would not be plug in during motor operation in some embodiments. Also, if there are no faults detected in phase legs 121-123 and three phase charging is being performed, switches 131 and 132 would be open to isolate rails 114 and 116 from node 158.

In some embodiments, power source 201 may be a single phase charger (such as with a 120V charger in the US or a 230V charger in Europe). In such cases, spare phase leg 124 can be used for single phase charging along with one other phase leg of phase legs 121-123 in that phase leg 124 can be connected to neutral wire. Accordingly, such a configuration may provide flexibility for some systems for handling charging from different power source configurations such as for a system that can be charged from single phase power or multiphase power. In other embodiments, conversion circuitry may include other switches (not shown) for connecting the other phase legs (121-123) to neutral.

Figure 4:
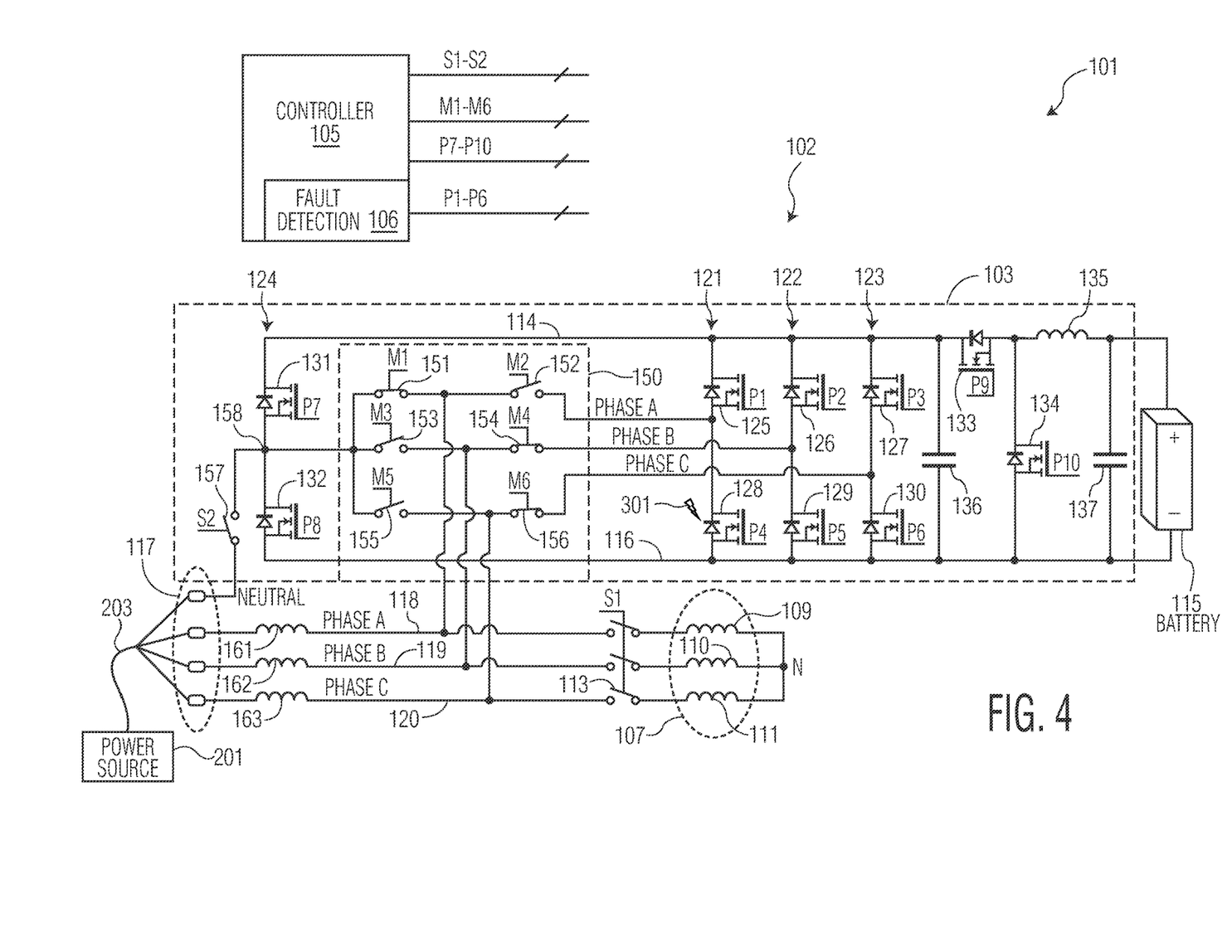
FIG. 4 is a circuit diagram of the converter of FIG. 1 during a three phase charging mode in response to a detected fault according to another embodiment of the present invention.

FIG. 4 shows a configuration of system 101 where a fault 301 is detected in phase leg 121 and spare phase leg 124 is used in place of faulty phase leg 121 for three phase mode charging of battery 115. In FIG. 4, a fault 301 is shown at power switch 128 of leg 121. In response to detecting the fault, switch 152 is opened to isolate line 118 from faulty switch 128 and switch 151 is closed such that spare phase leg 124 is utilized for multiphase charging of battery 115 in place of phase leg 121. Power switches 131 and 132 of spare phase leg 124 are opened and closed as would power switches 125 and 128, respectively, as if phase leg 121 were being used. Because switch 152 is open, no charge current flows through switch 128 if the fault was a short. In one embodiment, converter 102 performs 3 phase charging utilizing a bridgeless totem pole topology with the switch configuration shown in FIG. 4.

This configuration of switches 151-156 shown in FIG. 4 could also be used to implement spare phase leg 124 in response to a faulty phase leg for battery charging if motor 107 is supplying charge current to conversion circuitry 103 such as in a regenerative braking condition when the vehicle is slowing down. Accordingly, providing a spare phase leg that can be used to replace a faulty phase leg for charging a battery may provide for a vehicle that can continue to provide power to the battery during a regenerative braking condition in situations where the vehicle cannot be shut down immediately. Such a condition may occur when a fault is detected in one of phase legs 121-123 when the vehicle is moving (e.g., driving on a highway). In response to the detection of a phase leg fault, the vehicle may provide a user with a warning so that the user can stop the vehicle safely or take the vehicle immediately for service. In such a conduction, the implementation of a spare phase leg to enable three phase changing in a regenerative breaking condition may prevent a dangerous condition of excess current on one phase leg from a regenerative braking condition.

In other embodiments, in response to a detection of a fault in a phase leg (e.g., fault 301 in phase leg 121), converter 102 would remove the phase leg with the fault and charge battery 115 with the remaining two phase legs of phase legs 121, 122, and 123 in a single phase mode. For example, in response to fault 301, switch 152 would be opened to remove faulty phase leg 121 from the charging operation. Charging power would be provided by line 119 (Phase B) and line 120 (Phase C) to implement a single phase charging mode.

In one embodiment, converter implements a bridgeless totem pole topology when charging in a single phase mode utilizing two of three phase legs of phase legs 121-123. In such an embodiment, for the time period when an AC phase (e.g., Phase C) is at a lower voltage than the other AC phase (e.g., Phase B) utilized in charging, the lower power switch (e.g., power switch 130) of the phase leg (123) corresponding to the lower voltage AC phase (e.g., Phase C) is closed and the upper power switch (e.g., power switch 127) of the phase leg (e.g., phase leg 123) corresponding to the lower voltage AC phase is open. At this time, the higher voltage AC phase (e.g. Phase B) alternates between: 1) a load inductor subphase—where the lower power switch (e.g. power switch 129) of the phase leg (e.g. phase leg 122) associated with the higher voltage AC phase (e.g. Phase B) is closed and the upper power switch (e.g. power switch 126) of the phase leg (e.g., phase leg 122) associated with the higher voltage AC phase is open where energy is loaded in the boost inductor (e.g. boost inductor 162) of the higher voltage AC phase; and 2) a charge capacitor subphase—where the lower power switch (e.g., power switch 129) of the phase leg (e.g., phase leg 122) associated with the higher voltage AC phase (Phase B) is open and the upper power switch (e.g. power switch 126) of the phase leg (e.g. phase leg 122) associated with the higher voltage AC phase is closed to charge capacitor 136. The higher voltage AC phase would alternate between the load inductor subphase and the charge capacitor subphase during the period when the other AC phase is the lower voltage AC phase. In such a configuration, each of the two AC phases (e.g., Phase B and Phase C) would be the lower voltage AC phase for half of the time during charging.

However, converter 102 may charge in a single phase mode with two phase legs by other topologies and//or methods in other embodiments.

Figure 5:
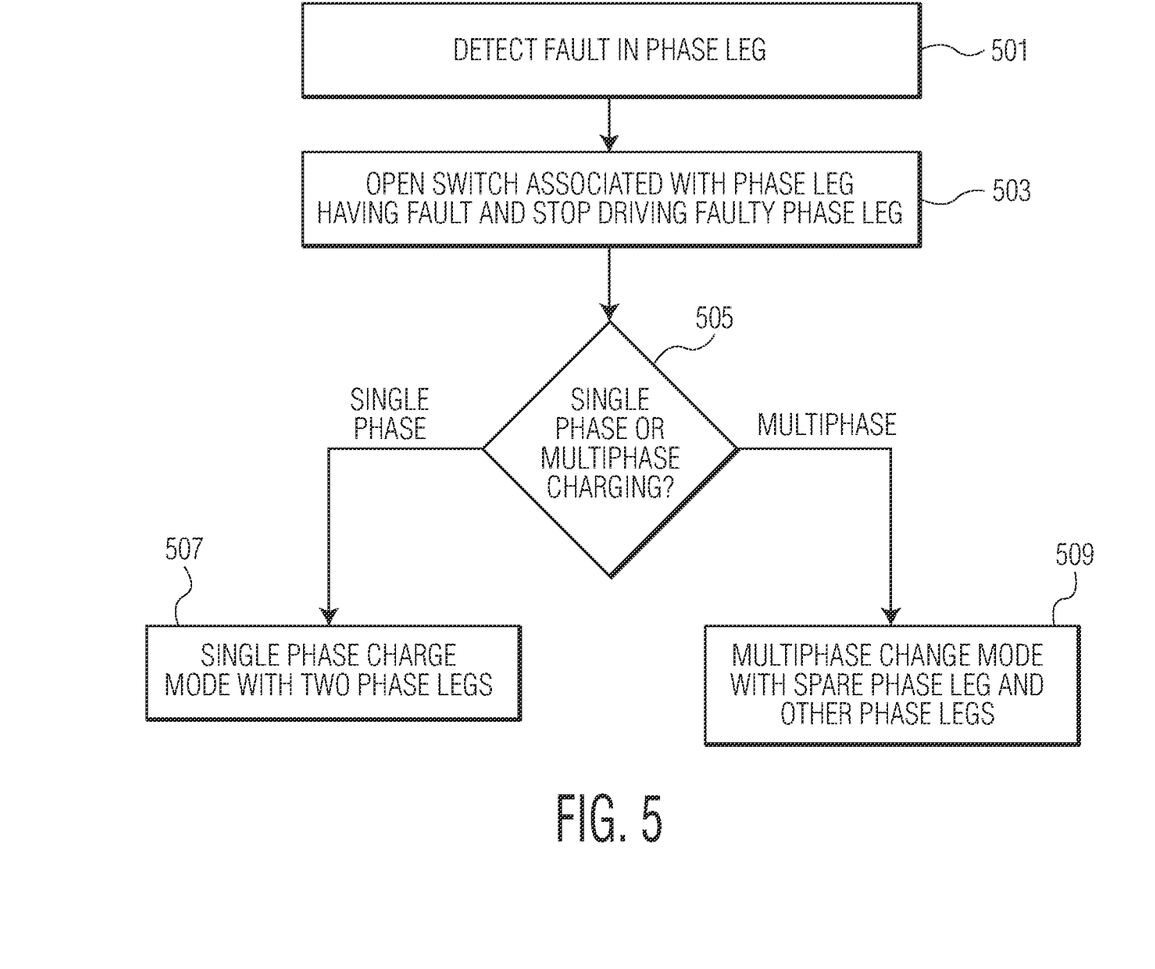
FIG. 5 is a flow diagram showing the operation of the converter of FIG. 1 according one embodiment of the present invention.

FIG. 5 is a flow diagram of a method for charging battery 115 in response to a detected fault in one of phase legs 121-123. In response to a detected fault in operation 501 by fault detection 106, controller 105 opens the switch of switches 152, 154, or 156 corresponding to the faulty phase leg in operation 503. Also, controller 105 stops driving the control signals (P1-P6) for the power switches of the faulty phase leg.

If single phase mode charging is to be used as decided in decision block 505, then in operation 507, single phase mode charging is performed, either with the two remaining nonfaulty phase legs or with the use of spare phase leg 124, where one of switches 151, 153, or 155 is closed and switch 157 is closed. If multiphase charging is to be performed as determined in decision block 505, then in operation 509, multiphase charging is performed with spare phase leg 124 being used in place of the faulty switch leg with one of switches 151, 153, or 155 being closed and with switch 157 being opened.

In some embodiments, the decision as to whether to perform single phase mode charging or multiphase mode charging would depend upon whether the battery is being charged from a power source 201 or being charged from a motor by a regenerative breaking process. For example, multiphase mode charging would be performed if the battery was being charged by motor 107 in a regenerative breaking process and single phase mode charging would be performed if being charged by an electric car charger (e.g., power source 201).

In some embodiments, a bidirectional power convertor would not include the option of selecting between multi- or single phase mode charging in response to a detected phase leg fault. In such embodiments, a converter would be permanently configured to charge in either a single phase mode or in a multiphase mode.

In some embodiments, converter 102 may include a second set of lines (not shown) for receiving regulated power for charging battery 115 from an external vehicle charging power source. Phase legs 121-124 would only be used for charging from motor 107 during regenerative breaking and not for charging from an external power source. In some embodiments, terminals 117 would receive a regulated DC voltage for charging battery 115 from an external charging source. In such an embodiment, switches 128-130 would be continuously open and switches 125-127 would be continuously closed to provide power to rail 114.

Figure 6:
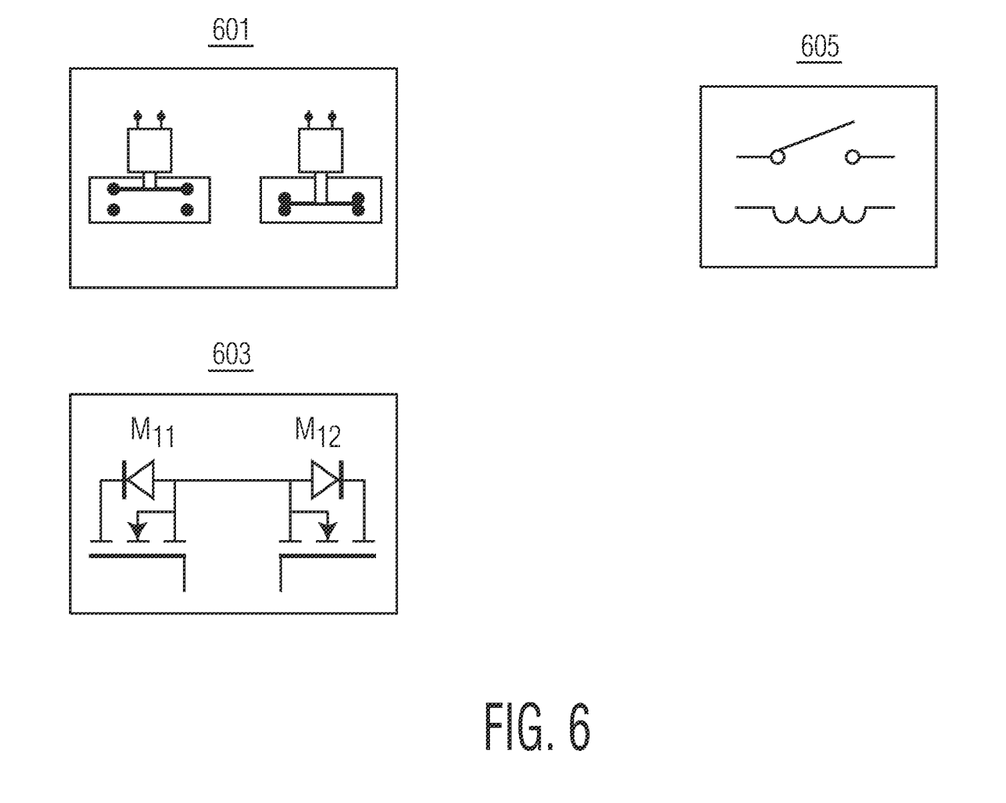
FIG. 6 shows example views of embodiments of bidirectional blocking switches that can be utilized in the converter of FIG. 1 according to one embodiment of the present invention.

FIG. 6 shows examples of switches that can be used as configuration switches 151-157. In some embodiments, switches 151-157 are "bidirectional blocking switches." A bidirectional blocking switch is a switch that can isolate one of its switch terminals when open when either a positive current is applied to the other switch terminal or a negative current is applied to the other switch terminal, and vice versa. Unitizing a bidirectional blocking switch for switches 151-157 allows for those switches to be utilized in blocking a short circuit fault in one of the phase legs.

Three examples of bidirectional blocking switches shown in FIG. 6 include a pyro-switch 601, a back to back MOSFET 603, and a relay 605. Other types of bidirectional blocking switches may be used in other embodiments.

Although system 101 implements a three phase multiphase charging, other systems may implement a different number of AC phases (e.g., 2, 4) in a multiphase charging mode. As used herein, the term "multiphase" (e.g., as in multiphase mode charging or multiphase motor) describes a configuration of multiple AC phases where at least two of the AC phases are offset from each other by a phase difference other than 0 degrees or 180 degrees.

Although converter 102 is shown supplying power to a drive motor 107 of a vehicle, converter 102 may also provide power to other devices of the vehicle as well (e.g., heaters, infotainment, motor controllers, sensors, actuators, other motors). In some embodiments, power to motor 107 may be provided through multiple switches, relays, and/or breakers (not shown). In some embodiments, converter 102 may be utilized to provide battery power to other systems such as a house or business. In some embodiments, converter 102 in a battery powered vehicle may be utilized in providing power to a house or building in emergency situations. In other embodiments, converter 102 may be used to provide power to other types of multiphase loads such as welders, transformers, or other power converters.

Features described herein with respect to one embodiment may be implemented in other embodiments described herein. A current electrode of a FET (field effect transistor) is a source or drain. A control electrode of a FET is a gate. A control electrode of a IGBT is a gate and the collector and emitters are the current electrodes of the IGBT.

Providing a bidirectional power converter with a fault detector for detecting faults in the phase loops of the conversion circuitry and removing utilization of the faulty phase legs while still charging the battery may provide for an electric motor control system or other multiphase load that is able to continue operation in spite of the faulty phase leg, which may enable a vehicle to be used safely until it can be repaired.

In one embodiment, a method for charging a battery includes, in a bidirectional power converter with conversion circuitry which is utilized for providing power to a multiphase load and for providing power for charging in a multiphase mode a battery, wherein the conversion circuitry includes a plurality of phase legs with at least one power switch that is opened and closed repeatedly to control power for powering the multiphase load and for charging the battery, determining whether a phase leg of the plurality of phase legs has a fault. The method includes in response to determining that a phase leg of the plurality of phase legs has a fault, opening a switch providing a conductive path between a node of the phase leg with the fault and a conductor for proving power to the multiphase load and for receiving power from a power source for charging the battery. The method includes performing a charging operation of the battery when the switch proving the conductive path to the phase leg with the fault is open due to a determined fault, wherein the performing the charging operation includes charging the battery from a power source where the conductor does not provide power to the bidirectional power converter to charge the battery and where the phase leg with the determined fault is not used in charging the battery.

In an example, the performing of the charging operation includes utilizing a spare phase leg with at least one power switch, wherein the spare phase leg is not used in powering the multiphase load or charging the battery when no faults are detected in the phase legs of the plurality of phase legs.

In an example, the charging operation is characterized as a single phase mode charging operation.

In an example, the spare phase leg includes a node connected in a charge path to a neutral supply conductor during the single phase mode charging mode operation.

In an example, the spare phase leg includes two power switches and the performing the charging operation includes utilizing another phase leg of the plurality of phase legs that does not include the detected fault, wherein the another phase leg includes two power switches, wherein the performing the charging operation includes opening and closing the two power switches of the spare phase leg at a lower frequency than a frequency at which the two power switches of the another phase leg are opened and closed.

In an example, the charging operation is characterized as a multiphase mode charging operation.

In an example, the multiphase load includes a multiphase motor, wherein the battery provides power for driving the multiphase motor, wherein the performing the charging operation includes charging the battery with power provided by the multiphase motor.

In an example, the charging operation is characterized as a single phase mode charging operation.

In an example, the switch is characterized as a bidirectional blocking switch.

In another embodiment, an apparatus includes a bidirectional power converter. The bidirectional power converter includes conversion circuitry including a plurality of phase legs each with at least one power switch that is opened and closed repeatedly to control power for powering a multiphase load and for charging a battery in a multiphase mode. The bidirectional power converter includes a plurality of switches, wherein each switch corresponds to a phase leg of the plurality of phase legs and is coupled to a node of the corresponding phase leg and to a corresponding conductor of a plurality of conductors for proving power to a multiphase load and for receiving power from a power source for charging the battery, wherein the each switch corresponding to each phase leg is closed when the phase leg is utilized in powering the multiphase load and when the phase leg is utilized in charging the battery in a multiphase mode. The bidirectional power converter includes a controller to detect a fault on a phase legs of the plurality of phase legs and to control the conductivity of the plurality of switches, wherein in response to a detected fault on a phase leg of the plurality of phase legs, the switch corresponding to the phase leg of the detected fault is open during the powering of the multiphase load and during the charging of the battery. The conversion circuitry includes a spare phase leg with at least one power switch, the spare phase leg is not used for powering the multiphase load or for charging the battery when no faults are detected in the plurality of phase legs, wherein when a fault is detected in a phase leg of the plurality of phase legs, the spare phase leg is used in charging the battery where the at least one power switch of the spare phase leg is opened and closed repeatedly during the charging the battery.

In an example, when a fault is detected in a phase leg of the plurality of phase legs, the spare phase leg is used in charging the battery in a single phase mode.

In an example, when a fault is detected in a phase leg of the plurality of phase legs, the switch of the plurality of switches corresponding to the phase leg is open and another switch of the plurality of switches corresponding to another phase leg of the plurality of phase legs is open, wherein the another phase leg is not used in the charging of the battery in a single phase mode.

In an example, when a fault is detected in a phase leg of the plurality of phase legs, the spare phase leg is used in charging the battery in a single phase mode from an external power source, wherein the spare phase leg includes a node that is coupled to a neutral supply terminal by a current path during charging in a single phase mode from the external power source.

In an example, when a fault is detected in a phase leg of the plurality of phase legs, the spare phase leg is used in charging the battery in a multi-phase mode.

In an example, the multiphase load includes a multiphase motor, wherein when a fault is detected in a phase leg of the plurality of phase legs, the spare phase leg is used in charging the battery in a multi-phase mode when the multiphase motor is providing power for the charging.

In an example, the plurality of switches are characterized as bidirectional blocking switches.

In another embodiment, an apparatus including a bidirectional power converter. The bidirectional power converter includes conversion circuitry including a plurality of phase legs each with at least one power switch that is opened and closed repeatedly to control power for powering a multiphase load and for charging a battery in a multiphase mode. The bidirectional power converter includes a plurality of switches, wherein each switch corresponds to a phase leg of the plurality of phase legs and is coupled to a node of the corresponding phase leg and to a corresponding conductor of a plurality of conductors for providing power to the multiphase load and for receiving power from a power source for charging the battery, wherein the each switch corresponding to each phase leg is closed when the phase leg is utilized in powering the multiphase load and when the phase leg is utilized in charging the battery in a multiphase mode. The bidirectional power converter includes a controller to detect a fault on a phase leg of the plurality of phase legs and to control the conductivity of the plurality of switches, wherein in response to a detected fault on a phase leg of the plurality of phase legs, the switch corresponding to the phase leg of the detected fault is open during the powering of the load and during the charging of the battery. The conversion circuitry includes a spare phase leg with at least one power switch, the spare phase leg is not used for powering the multiphase load or for charging the battery in a multiphase mode when no faults are detected in the plurality of phase legs, wherein when the battery is charged in a single phase mode, the spare phase leg is used in charging the battery where the at least one power switch of the spare phase leg is opened and closed repeatedly during the charging the battery, wherein when the spare phase leg is used in charging the battery in a single phase mode another phase leg of the plurality of phase legs is used in charging the battery where an at least one power switch of the another phase leg is opened and closed repeatedly during the charging the battery.

In an example, when the spare phase leg is used in charging the battery in a single phase mode, the switches of the plurality of switches corresponding to the phase legs of the plurality of phase legs other than the another phase leg are open and the phase legs of the plurality of phase legs other than the other phase leg are not used in charging in the single phase mode.

In an example, when the spare phase leg is used in charging the battery in a single phase mode, the spare phase leg includes a node that is coupled to a neutral supply terminal by a current path during charging in the single phase mode.

In an example, a node of the spare phase leg is connected to a neutral terminal for connecting to a neutral wire.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the scope of this invention.

The invention claimed is:

1. A method for charging a battery:
in a bidirectional power converter with conversion circuitry which is utilized for providing power to a multiphase load and for providing power for charging in a multiphase mode a battery, wherein the conversion circuitry includes a plurality of phase legs with at least one power switch that is opened and closed repeatedly to control power for powering the multiphase load and for charging the battery, determining whether a phase leg of the plurality of phase legs has a fault;
in response to determining that a phase leg of the plurality of phase legs has a fault, opening a switch that was closed for providing a conductive path between a node of the phase leg with the fault and a conductor for providing power to the multiphase load and for receiving power from a power source for charging the battery;
performing a charging operation of the battery when the switch that was closed for providing the conductive path to the phase leg with the fault is open due to a determined fault, wherein the performing the charging operation includes charging the battery from a power source where the conductor does not provide power to the bidirectional power converter to charge the battery and where the phase leg with the determined fault is not used in charging the battery.

2. The method of claim 1 wherein the performing the charging operation includes utilizing a spare phase leg with at least one power switch, wherein the spare phase leg is not used in powering the multiphase load or charging the battery when no faults are detected in the phase legs of the plurality of phase legs.

3. The method of claim 2 wherein the charging operation is characterized as a single phase mode charging operation.

4. The method of claim 3 wherein the spare phase leg includes a node connected in a charge path to a neutral supply conductor during the single phase mode charging mode operation.

5. The method of claim 3 wherein the spare phase leg includes two power switches and the performing the charging operation includes utilizing another phase leg of the plurality of phase legs that does not include the detected fault, wherein the another phase leg includes two power switches, wherein the performing the charging operation includes opening and closing the two power switches of the spare phase leg at a lower frequency than a frequency at which the two power switches of the another phase leg are opened and closed.

6. The method of claim 2 wherein the charging operation is characterized as a multiphase mode charging operation.

7. The method of claim 6 wherein the multiphase load includes a multiphase motor, wherein the battery provides power for driving the multiphase motor, wherein the performing the charging operation includes charging the battery with power provided by the multiphase motor.

8. The method of claim 1 wherein the charging operation is characterized as a single phase mode charging operation.

9. The method of claim 1 wherein the switch is characterized as a bidirectional blocking switch.

10. An apparatus comprising:
a bidirectional power converter including:
conversion circuitry including a plurality of phase legs each with at least one power switch that is opened and closed repeatedly to control power for powering a multiphase load and for charging a battery in a multiphase mode;
a plurality of switches, wherein each switch corresponds to a phase leg of the plurality of phase legs and is coupled to a node of the corresponding phase leg and to a corresponding conductor of a plurality of conductors for providing power to a multiphase load and for receiving power from a power source for charging the battery, wherein the each switch corresponding to each phase leg is closed when the phase leg is utilized in powering the multiphase load and when the phase leg is utilized in charging the battery in a multiphase mode;
a controller to detect a fault on a phase leg of the plurality of phase legs and to control the conductivity of the plurality of switches, wherein in response to a detected fault on a phase leg of the plurality of phase legs, the switch corresponding to the phase leg of the detected fault is open during the powering of the multiphase load and during the charging of the battery;
wherein the conversion circuitry includes a spare phase leg with at least one power switch, the spare phase leg is not used for powering the multiphase load or for charging the battery when no faults are detected in the plurality of phase legs, wherein when a fault is detected in a phase leg of the plurality of phase legs, the spare phase leg is used in charging the battery where the at least one power switch of the spare phase leg is opened and closed repeatedly during the charging the battery.

11. The apparatus of claim 10 wherein when a fault is detected in a phase leg of the plurality of phase legs, the spare phase leg is used in charging the battery in a single phase mode.

12. The apparatus of claim 11 wherein when a fault is detected in a phase leg of the plurality of phase legs, the switch of the plurality of switches corresponding to the phase leg is open and another switch of the plurality of switches corresponding to another phase leg of the plurality of phase legs is open, wherein the another phase leg is not used in the charging of the battery in a single phase mode.

13. The apparatus of a claim 11 wherein when a fault is detected in a phase leg of the plurality of phase legs, the spare phase leg is used in charging the battery in a single phase mode from an external power source, wherein the spare phase leg includes a node that is coupled to a neutral supply terminal by a current path during charging in a single phase mode from the external power source.

14. The apparatus of claim 10 wherein when a fault is detected in a phase leg of the plurality of phase legs, the spare phase leg is used in charging the battery in a multiphase mode.

15. The apparatus of claim 10 wherein the multiphase load includes a multiphase motor, wherein when a fault is detected in a phase leg of the plurality of phase legs, the spare phase leg is used in charging the battery in a multiphase mode when the multiphase motor is providing power for the charging.

16. The apparatus of claim 10 wherein the plurality of switches are characterized as bidirectional blocking switches.

17. An apparatus comprising:
a bidirectional power converter including:
conversion circuitry including a plurality of phase legs each with at least one power switch that is opened and closed repeatedly to control power for powering a multiphase load and for charging a battery in a multiphase mode;
a plurality of switches, wherein each switch corresponds to a phase leg of the plurality of phase legs and is coupled to a node of the corresponding phase leg and to a corresponding conductor of a plurality of conductors for providing power to the multiphase load and for receiving power from a power source for charging the battery, wherein the each switch corresponding to each phase leg is closed when the phase leg is utilized in powering the multiphase load and when the phase leg is utilized in charging the battery in a multiphase mode;
a controller to detect a fault on a phase leg of the plurality of phase legs and to control the conductivity of the plurality of switches, wherein in response to a detected fault on a phase leg of the plurality of phase legs, the switch corresponding to the phase leg of the detected fault is open during the powering of the load and during the charging of the battery;
wherein the conversion circuitry includes a spare phase leg with at least one power switch, the spare phase leg is not used for powering the multiphase load or for charging the battery in a multiphase mode when no faults are detected in the plurality of phase legs, wherein when the battery is charged in a single phase mode, the spare phase leg is used in charging the battery where the at least one power switch of the spare phase leg is opened and closed repeatedly during the charging the battery, wherein when the spare phase leg is used in charging the battery in a single phase mode another phase leg of the plurality of phase legs is used in charging the battery where an at least one power switch of the another phase leg is opened and closed repeatedly during the charging the battery.

18. The apparatus of claim 17 wherein when the spare phase leg is used in charging the battery in a single phase mode, the switches of the plurality of switches corresponding to the phase legs of the plurality of phase legs other than the another phase leg are open and the phase legs of the plurality of phase legs other than the other phase leg are not used in charging in the single phase mode.

19. The apparatus of a claim 17 wherein when the spare phase leg is used in charging the battery in a single phase mode, the spare phase leg includes a node that is coupled to a neutral supply terminal by a current path during charging in the single phase mode.

20. The apparatus of claim 17 wherein a node of the spare phase leg is connected to a neutral terminal for connecting to a neutral wire.

\* \* \* \* \*